(12) United States Patent
Strauss

(10) Patent No.: US 9,060,600 B2
(45) Date of Patent: Jun. 23, 2015

(54) TROLLEY FOR PREPARING AND DISPENSING DRINKS

(75) Inventor: Andreas Strauss, Mittenaar (DE)

(73) Assignee: AIR-ELTEC PATENT UG, Herborn (DE)

( * ) Notice: Subject to any disclaimer, the term of this patent is extended or adjusted under 35 U.S.C. 154(b) by 95 days.

(21) Appl. No.: 13/581,336

(22) PCT Filed: Feb. 23, 2011

(86) PCT No.: PCT/DE2011/000182
§ 371 (c)(1),
(2), (4) Date: Aug. 27, 2012

(87) PCT Pub. No.: WO2011/124192
PCT Pub. Date: Oct. 13, 2011

(65) Prior Publication Data

US 2012/0318822 A1   Dec. 20, 2012

(30) Foreign Application Priority Data

Apr. 8, 2010  (DE) .......................... 10 2010 014 392

(51) Int. Cl.
*B67D 7/74* (2010.01)
*E04H 3/04* (2006.01)
(Continued)

(52) U.S. Cl.
CPC ................. *A47B 31/06* (2013.01); *A47B 31/02* (2013.01); *B62B 2202/67* (2013.01); *B67D 1/0021* (2013.01); *B67D 1/04* (2013.01); *B67D 1/0406* (2013.01); *B67D 2210/00128* (2013.01)

(58) Field of Classification Search
CPC ........ A47B 31/00; A47B 31/02; A47B 31/06; A47B 2031/002; A47B 2031/02; A47B 2031/026; A47B 9/18; A47B 9/00; B67D 1/04; B67D 1/0406; B67D 1/0418; B67D 1/0888; B67D 1/0889; B67D 7/84; B67D 7/845; B67D 2210/00133; B67D 2210/00136; B67D 2210/00139; B62B 3/02

USPC .............. 222/129.1, 131, 132, 135, 608, 612, 222/626, 173, 183, 325, 399, 538, 330; 248/129, 157; 312/205, 400, 249.8, 312/294, 304, 306; 186/40, 45, 50
See application file for complete search history.

(56) References Cited

U.S. PATENT DOCUMENTS 742,118 A * 10/1903 Huddleston ................. 312/272.5
1,428,629 A * 9/1922 Gunn ............................ 312/282
(Continued)

FOREIGN PATENT DOCUMENTS

CN     1107639(c)    *  5/2003 ............... B67D 1/00
DE     198 47 366 A1    4/2000
(Continued)

OTHER PUBLICATIONS

Patent Examination Report No. 1, Application No. 2011238219, Applicants: Air-Eltec Patent (haftungsbeschrankt), Issued: Jul. 2, 2014, Earliest Priority Date: Apr. 8, 2010, Examination Request Date: Mar. 13, 2013, 3 pages.
(Continued)

*Primary Examiner* — Patrick M Buechner
(74) *Attorney, Agent, or Firm* — Rothwell, Figg, Ernst & Manbeck, P.C.

(57) ABSTRACT

A trolley for preparing and dispensing drinks, with individual drink selection such that the drinks are prepared from cold-water and hot-water tanks and extracts. The component parts of the drink are fed via connecting lines, by pumping units, by way of a dispensing unit and are filled into a drinking vessel. It is for this purpose that the dispensing unit can be adjusted from an upper, operating position into a lowered, storage position, in which it is incorporated in the construction of the trolley, beneath an upper boundary surface. The dispensing unit has a dispensing location with a plurality of feed openings in a dispensing head, which is arranged above an inserted drinking vessel, such that each feed opening is connected to, and controllable by, a separate feed line for hot water and cold water and extracts.

8 Claims, 3 Drawing Sheets

(51) Int. Cl.
    *A47B 31/06*    (2006.01)
    *A47B 31/02*    (2006.01)
    *B67D 1/00*     (2006.01)
    *B67D 1/04*     (2006.01)

(56) References Cited

U.S. PATENT DOCUMENTS

| | | | | |
|---|---|---|---|---|
| 1,676,108 A | * | 7/1928 | Novak | 108/20 |
| 1,772,111 A | * | 8/1930 | Rice | 222/108 |
| 2,461,197 A | * | 2/1949 | Chambers | 62/239 |
| 2,627,445 A | * | 2/1953 | Lyon | 312/403 |
| 2,812,227 A | * | 11/1957 | Hill | 312/290 |
| 2,895,311 A | * | 7/1959 | Spalvins | 62/258 |
| 3,180,529 A | * | 4/1965 | Buffington | 222/131 |
| 3,232,489 A | * | 2/1966 | Buffington | 222/108 |
| 3,240,395 A | | 3/1966 | Carver | |
| 3,327,902 A | * | 6/1967 | Alterwitz | 222/108 |
| 3,650,591 A | * | 3/1972 | Longmire, Sr. | 312/312 |
| 3,677,173 A | * | 7/1972 | Fogle et al. | 99/357 |
| 3,735,898 A | * | 5/1973 | Smith | 222/129.4 |
| 3,751,101 A | * | 8/1973 | Miller et al. | 280/79.2 |
| 3,877,744 A | * | 4/1975 | Miller | 296/22 |
| 3,932,009 A | * | 1/1976 | Zollinger | 312/312 |
| 3,933,275 A | * | 1/1976 | Metzner et al. | 222/131 |
| 3,997,028 A | * | 12/1976 | Lopez | 186/44 |
| 4,068,781 A | | 1/1978 | Toth | |
| 4,076,349 A | | 2/1978 | Gettleman et al. | |
| 4,161,234 A | * | 7/1979 | Munn | 186/52 |
| 4,700,993 A | * | 10/1987 | Fu-Long | 312/312 |
| 4,938,387 A | | 7/1990 | Kervefors et al. | |
| 5,000,357 A | * | 3/1991 | Shannon et al. | 222/129.1 |
| 5,390,834 A | * | 2/1995 | Bitter et al. | 222/608 |
| 6,053,359 A | * | 4/2000 | Goulet et al. | 221/221 |
| 6,820,763 B2 | * | 11/2004 | Bilskie et al. | 222/61 |
| 6,926,170 B2 | * | 8/2005 | Groesbeck | 222/63 |
| 6,969,132 B1 | * | 11/2005 | Viville | 312/306 |
| 7,044,335 B2 | * | 5/2006 | Aguirre et al. | 222/129.1 |
| 8,424,883 B1 | * | 4/2013 | Ramos | 280/35 |
| 2002/0093273 A1 | * | 7/2002 | Itakura | 312/205 |
| 2004/0226960 A1 | * | 11/2004 | Aguirre et al. | 222/1 |
| 2008/0120187 A1 | * | 5/2008 | Wesley et al. | 705/15 |
| 2012/0318822 A1 | * | 12/2012 | Strauss | 222/129.1 |

FOREIGN PATENT DOCUMENTS

| | | |
|---|---|---|
| DE | 20 2008 005701 U1 | 10/2008 |
| DE | 20 2008 005 701 U1 | 11/2008 |
| EP | 0 373 126 A1 | 6/1990 |
| WO | 00/21790 A1 | 4/2000 |
| WO | 2006/058713 A1 | 6/2006 |
| WO | 2006058713 A1 | 6/2006 |

OTHER PUBLICATIONS

First Examination Report dated Jul. 29, 2014, cited in Chinese Patent Application No. 201180009583.9, 8 pgs.

* cited by examiner

TROLLEY FOR PREPARING AND
DISPENSING DRINKS

CROSS REFERENCE TO RELATED
APPLICATION

This application is a 35 U.S.C. 371 National Phase Entry Application from PCT/DE2011/000182, filed Feb. 23, 2011, which claims the benefit of German Patent Application No. 10 2010 014 392.8 filed on Apr. 8, 2010, the disclosure of which is incorporated herein in its entirety by reference.

FIELD OF THE INVENTION

The invention relates to a serving trolley designed in the form of a box for the reception of arrangements for the preparing and dispensing of beverages and consumables, in particular for transporting means for the individual selection, production and dispensing of beverages at the seat of passengers, wherein water containers for cold and hot water and storage containers with different extracts are incorporated and for the selective output of hot or cold beverages and from the respective water containers and the extract are suppliable via connecting ducts by means of pump arrangements to a dispensing unit with dispensing points and are fillable into drinking vessels.

BACKGROUND OF THE INVENTION

The provision of serving trolleys of this type is known in various designs. In this connection, there is the drawback that a plurality of dispensing units corresponding to the types of beverages offered has to be present as the dispensing unit and consequently the receiving drinking vessel has to be placed correspondingly in different positions.

One arrangement as claimed in the generic features is known according to U.S. Pat. No. 4,076,349 A. In this connection, however, separate dispensing points are arranged for each beverage and the drinking vessel is to be assigned to different positions corresponding to the beverage. Consequently, a compact arrangement is not possible and wrong assignments cannot be ruled out either.

In addition, DE 198 47 366 A1 makes known an arrangement where soluble beverage powder is supplied to a drinking vessel as the storage vessel which is placeable in one position and hot water is then supplied.

For use in aircraft, said known arrangements require additional measures as they are not usable in existing holds in the galley and a correspondingly secured arrangement can be effected for take-off and landing.

BRIEF SUMMARY OF THE INVENTION

It is the object of the invention to carry out an operationally secure filling of drinking vessels with a selection of different beverages and to create an arrangement which can be used, even in aircraft, using the existing holds.

This object is achieved as claimed in the invention in that the dispensing unit has a dispensing point which is adjustable from an upper operating position into a lowerable storage position into the structure of the serving trolley below an upper boundary surface and the dispensing point has several supply openings in a dispensing head above a positioned drinking vessel, wherein each supply opening of the dispensing point is connected to a separate supply duct for different beverages from hot water, cold water and extracts and is controllable and all supply openings in the region of the reception opening of the positioned drinking vessel are arranged in a single receiving position for the filling process.

As a result, an arrangement is created with a high standard of hygiene which is also suitable for aircraft provision. At the same time, it is made possible for the drinking vessel, irrespective of the selection of the beverage, to be always placed in the same position and consequently for wrong settings with the beverages overflowing and harming the passengers, where applicable, to be avoided.

To increase the capacity and for operating from two sides it is provided that two dispensing units are arranged associated in parallel.

In addition, it is proposed that the pumps are operated by means of a power source, such as a battery, and/or a gas bottle.

One advantageous configuration is created in that the gas bottle contains a $CO_2$ gas which is used for cold water carbonization and/or as a means for driving the pump.

For simple operation and central control, it is proposed that the selection of beverages with the supply of extracts and of water from the associated water container as well as of the individual supply lines with associated pumps can be carried out by means of an electronic control unit with an operating panel.

In addition, it is provided that the storage containers for the individual extracts are arranged so as to be replaceable in the form of a row on the lowerable dispensing unit.

BRIEF DESCRIPTION OF THE SEVERAL
VIEWS OF THE DRAWING(S)

Exemplary embodiments of the invention are shown schematically in the drawing, in which.

DETAILED DESCRIPTION OF THE INVENTION

Figure 1:
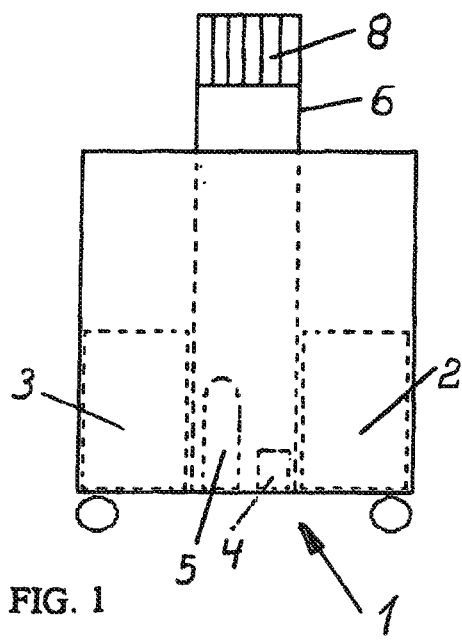
FIG. 1 shows a side view of a serving trolley with the dispensing unit in an operating position and with incorporated extract containers.

The serving trolley 1 shown is in the form of a trolley for the supply of beverages in aircraft. An insulated container 2 for hot water and a container 3 for cold water are arranged in the serving trolley for this purpose. In addition, there is a power supply 4 in the form of a chargeable battery and a $CO_2$ cartridge 5, a dispensing unit 6 with a dispensing point 7 being lowerable by means of a lift system (not shown in any detail) from an operating position into a storage position inside the serving trolley 1 below an upper boundary surface.

Figure 2:
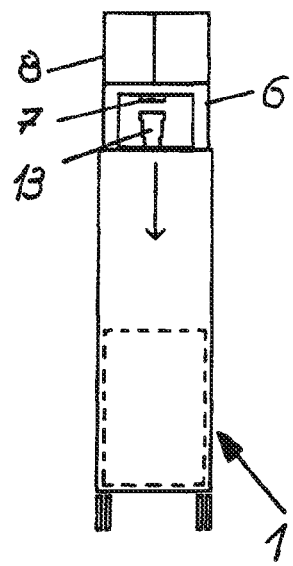
FIG. 2 shows a front view according to FIG. 1.
Figure 3:
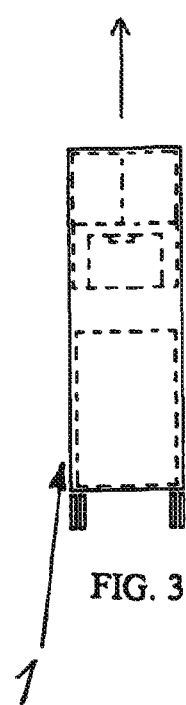
FIG. 3 shows a front view as in FIG. 2 with a lowered dispensing unit.
Figure 4:
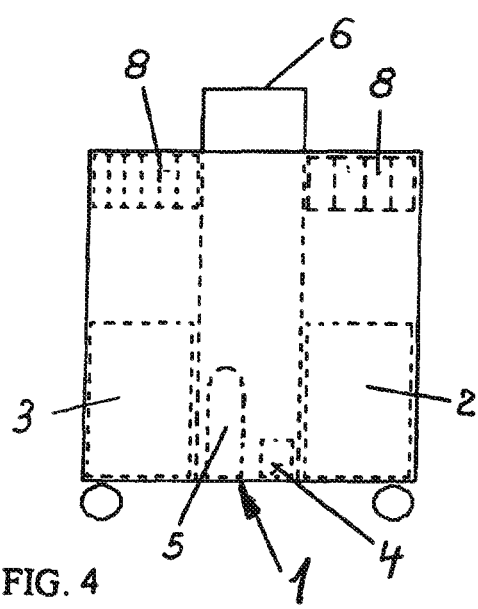
FIG. 4 shows a further exemplary embodiment with a side view of a serving trolley according to FIG. 1 and extract containers in the serving trolley.
Figure 5:
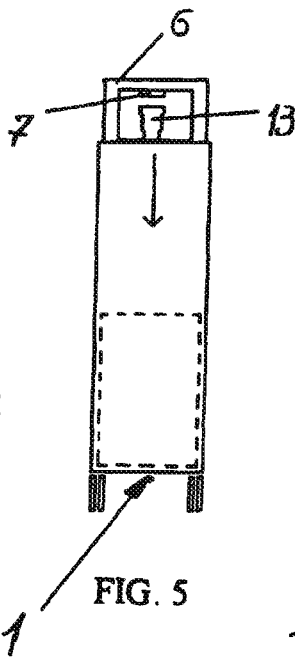
FIG. 5 shows a front view according to FIG. 4.
Figure 6:
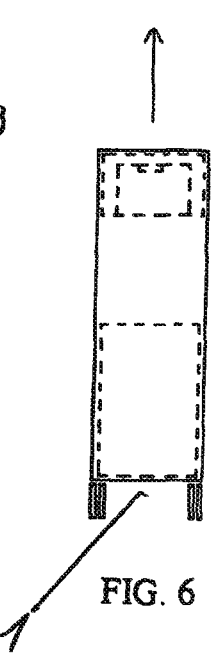
FIG. 6 shows a front view according to FIG. 5 with a lowered dispensing unit.
Figures 7, 8:
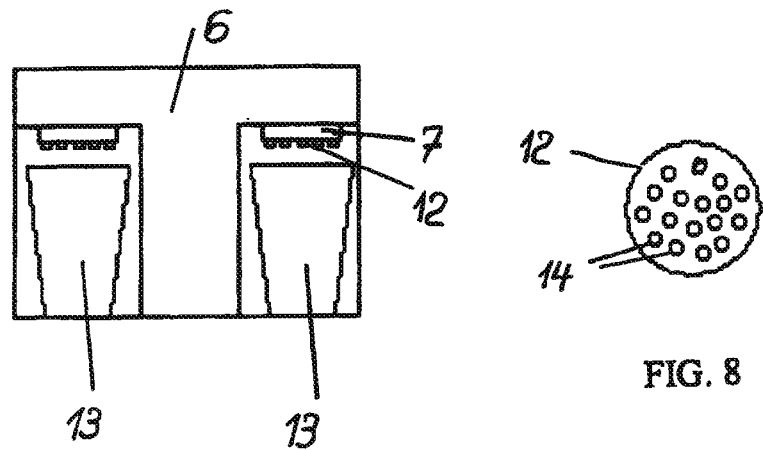
FIG. 7 shows a dispensing unit consisting of two units arranged in parallel.
FIG. 8 shows a top view of a dispensing head with a plurality of supply openings.

In the exemplary embodiment according to FIGS. 1 to 3, corresponding extracts for the production of beverages from different containers 9, 10, 11 are incorporated in the form of a row 8 in the lowerable dispensing unit 6, whilst in the configuration according to FIGS. 4 to 6 the row 8 is arranged in the serving trolley 1.

The dispensing point 7 is formed by a dispensing head 12 and is arranged above a receiving means for a drinking vessel 13 to be filled. The dispensing head 12 has a plurality of supply openings 14 which are all in the region of the receiving opening of the positioned drinking vessel 13. Each supply opening 14 has a separate supply duct 15 and, with pumps 16 arranged in line, is connected to the containers 2, 3 for water and to the individual containers 9, 10, 11 with the different extracts of the row 8 used for producing the beverage.

The corresponding syrup containers 9, 10, 11 and the water containers 2, 3 as well as the CO2 cartridge 5 are actuated by means of a known configuration of a central electronic control unit 17 with an operator's panel to select the beverage to be filled on the serving trolley 1 and the components for a selected beverage are supplied selectively in a controlled manner to a drinking vessel 13 in the prescribed amount by means of the supply openings 14 of the dispensing head 12 by means of the associated controlled pumps 16.

Figure 9:
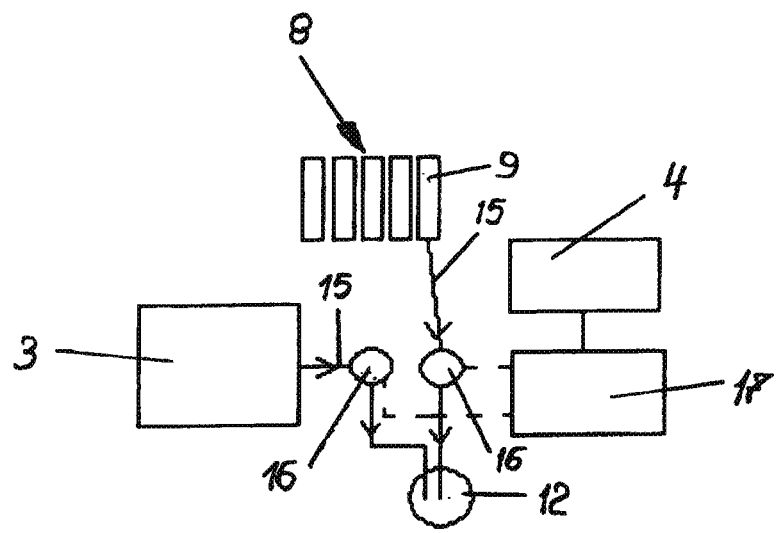
FIG. 9 shows a functional diagram for dispensing a juice beverage.

To elucidate the system, the dispensing of different beverages is explained. The dispensing of a juice beverage is explained in principle according to FIG. 9. The container 3 for cold water and the container 9 of the row 8 with the juice extract are actuated for this purpose, said containers are connected to separate supply openings 14 of the dispensing head 12 by means of separate supply ducts 15. The supply of material, which is carried out by means of the control unit 17 once the beverage type and amount have been selected, is controlled by the pumps 16 of the supply ducts 15. In this connection, the electricity is supplied by means of the associated power supply 4 in the form of a chargeable battery in the serving trolley 1.

Figure 10:
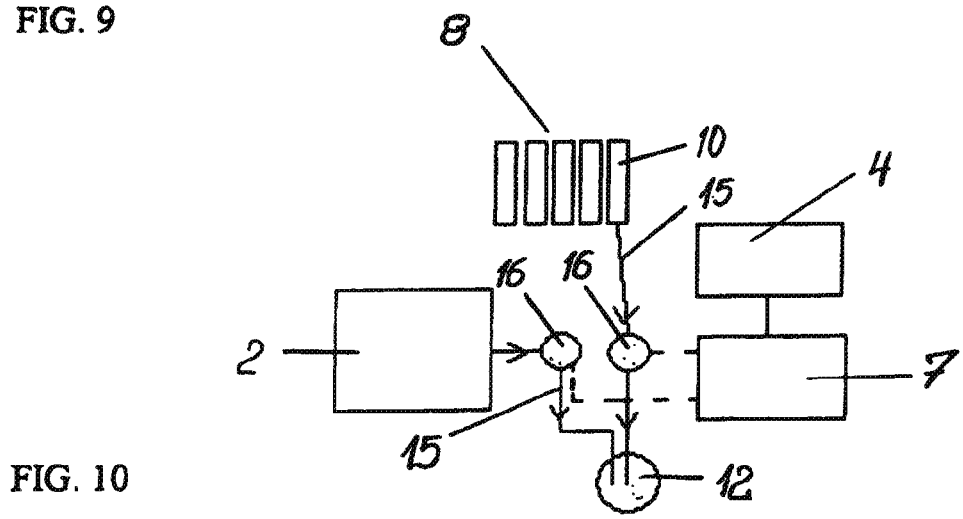
FIG. 10 shows a functional diagram for dispensing a hot beverage.

In the case of dispensing a hot beverage according to FIG. 10, the container 2 for hot water and the container 10 with coffee or tea concentrate are actuated in a corresponding manner by means of the control unit 17, which containers are connected to the supply openings 15 of the dispensing head 12 by means of the supply ducts 15 and pumps 16.

Figure 11:
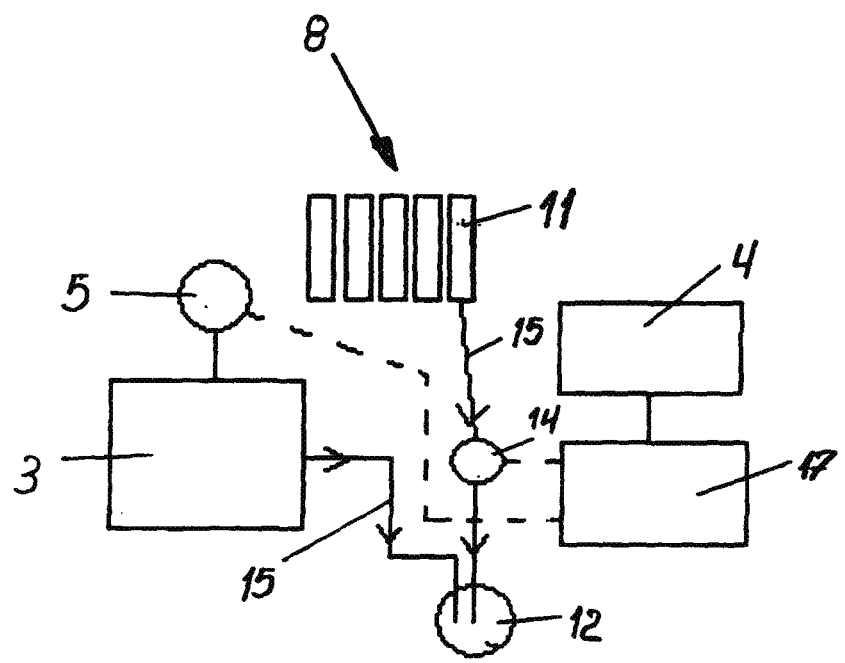
FIG. 11 shows a functional diagram for dispensing a juice beverage.

In addition, a juice beverage is dispensed according to FIG. 11. In this connection, the container 3 for cold water with the CO2 cartridge 5 and the container 11 with the corresponding extract are actuated by means of the control unit 17 and the beverage portions in the form of water and extract are supplied via the supply ducts 15, which are connected to the supply openings 14 of the dispensing head 12, by means of the pump 14 as well as the cartridge 5 for carbonization. In addition, it is obviously also possible to connect a pump for the water.

The invention claimed is:

1. A serving trolley designed in the form of a box for the reception of arrangements for preparing and dispensing beverages and consumables, wherein water containers for cold and hot water and storage containers with different extracts are incorporated and for the selective output of hot or cold beverages and from the respective water containers and the extract are suppliable via connecting ducts by pump arrangements to a dispensing unit with dispensing points and are fillable into drinking vessels,
  wherein the dispensing unit has a dispensing point that is adjustable from an upper operating position to a lowered storage position into the structure of the serving trolley below an upper boundary surface,
  wherein the dispensing unit is adjustable from the upper operating position into the lower operating position via vertical, non-horizontal translatory adjustment, and
  wherein the dispensing point has several supply openings in a dispensing head above a positioned drinking vessel, wherein each supply opening of the dispensing point is connected to a separate supply duct for different beverages produced from hot water, cold water and extracts and is controllable and all supply openings in the region of the reception opening of the positioned drinking vessel are arranged for filling in a single reception position.

2. The serving trolley as claimed in claim 1, wherein two dispensing units are arranged associated in parallel.

3. The serving trolley as claimed in claim 1, wherein the pump arrangements are operated by a power source.

4. The serving trolley as claimed in claim 1, further comprising a gas bottle that contains a CO2 gas which is used for cold water carbonization and/or for driving the pump arrangements.

5. The serving trolley as claimed in claim 1, wherein the selection of the beverages with the supply of extracts and of the water from the associated water container as well as of the individual supply ducts with associated pumps can be carried out by an electronic control unit with an operating panel.

6. The serving trolley as claimed in claim 1, wherein the storage containers for the individual extracts are arranged so as to be replaceable in the form of a row on the dispensing unit while the dispensing point is in the lowered storage position.

7. The serving trolley as claimed in claim 1, wherein the trolley is configured to transport individual selection, production and dispensing of beverages at seats of passengers.

8. The serving trolley as claimed in claim 3, wherein the power source is a battery, and/or a gas bottle.

* * * * *